No. 699,274. Patented May 6, 1902.
J. S. WOOD, Sr.
ACETYLENE GAS GENERATOR.
(Application filed July 5, 1901.)

(No Model.) 2 Sheets—Sheet 2.

WITNESSES: INVENTOR:
Joseph S. Wood, Sr.

UNITED STATES PATENT OFFICE.

JOSEPH S. WOOD, SR., OF BROOKLYN, NEW YORK.

ACETYLENE-GAS GENERATOR.

SPECIFICATION forming part of Letters Patent No. 699,274, dated May 6, 1902.

Application filed July 5, 1901. Serial No. 67,242. (No model.)

*To all whom it may concern:*

Be it known that I, JOSEPH S. WOOD, Sr., a citizen of the United States, residing at Brooklyn, in the county of Kings and State of New York, have invented certain new and useful Improvements in Acetylene-Gas Machines, of which the following is a specification.

This invention relates to apparatus for generating gas for light, heat, and power in which acetylene or rich carbureted hydrogen gas is generated from carbid of calcium or other chemical substance in contact with water and in which the rich gas is mixed in regulated proportions with air for making a gas which can be burned in ordinary gas-burners or incandescent burners for illuminating purposes.

The object of my invention is to provide an apparatus which is similar and compact in construction, not liable to get out of order, and which can be easily operated; also, to provide for condensing the steam or vapor in the gas before its delivery to the burners.

Another object of my invention is to provide for mixing gas and air by an injector and a regulator and delivering the carbureted gas to the house service-pipe at a low pressure, so that gas will not flow back and escape through the air-port of the injector and so that better combustion and illumination are produced at the burners. The ordinary cheap gas-burner can therefore be used for producing the desired illuminating effect.

My invention consists in the construction and arrangement of certain parts or devices in a gas-generating apparatus comprising a central water-tank having at the bottom a gas expansion and condensing chamber, a generator having a holder for carbid of calcium or other chemical substance, a gas-regulator having a rising and falling gasometer, a gas and air mixing injector having a valve-and-lever connection with the gasometer of the regulator, a second gas expansion and condensing chamber, and suitable gas and water pipe connections between the parts, and the necessary details of construction for making an operative apparatus.

I will now describe the details of construction of my apparatus by reference to the accompanying drawings, in which—

Figure 1:
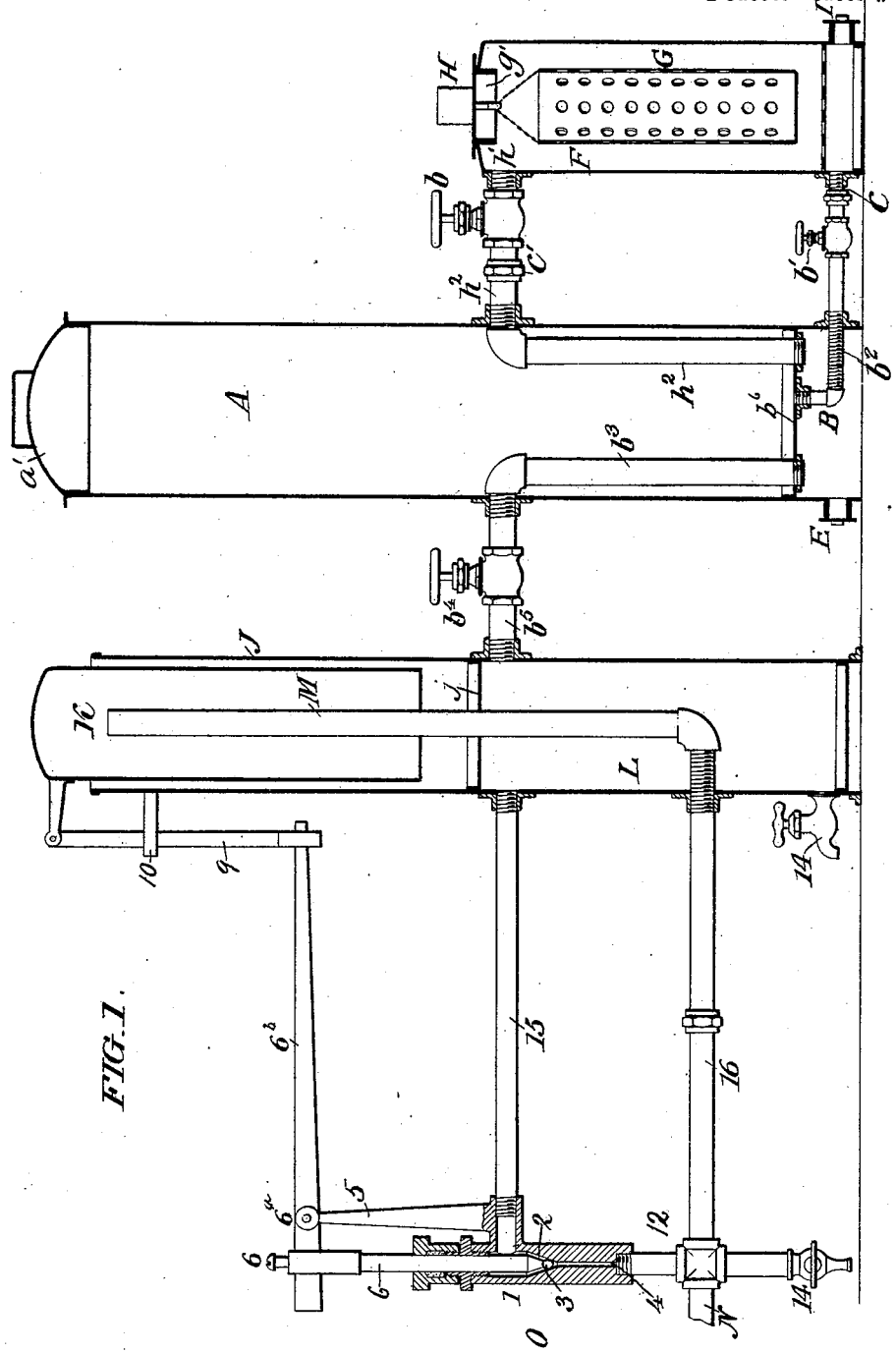
Figure 2:
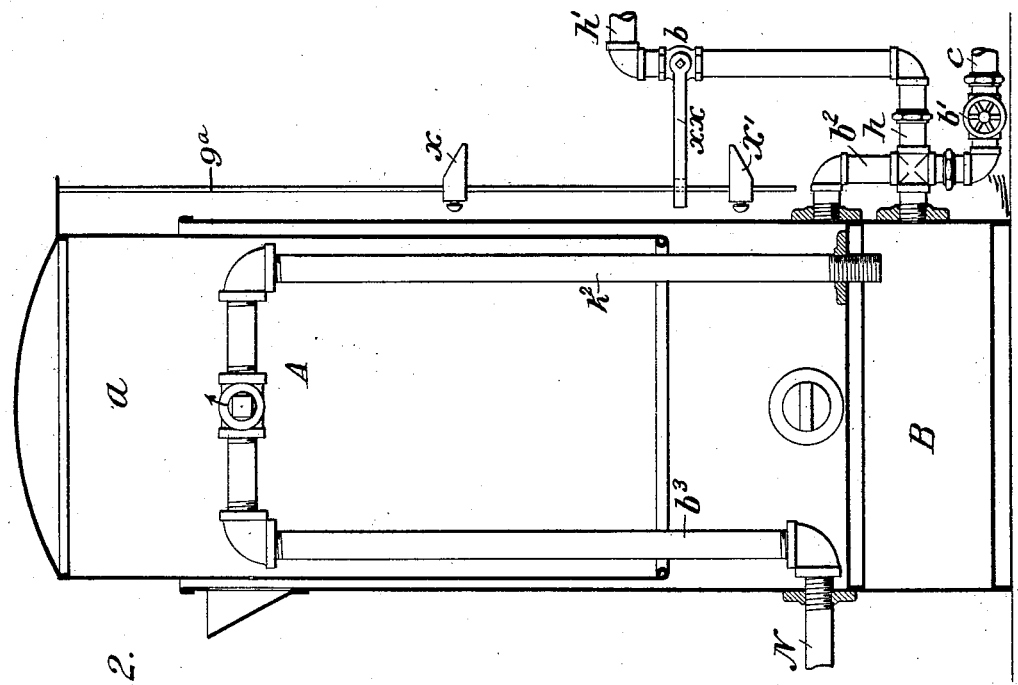

Figure 1 represents a vertical longitudinal section. Fig. 2 represents a vertical section of a modification of the central water-tank, including a gasometer in the tank for storing gas and connecting devices for controlling the flow of gas from the generator.

The central water-tank A is constructed of sufficient height to provide a head of water under sufficient pressure to supply the generator and is provided at the top with a removable cover $a'$ and near the bottom with a partition-plate $b^6$, forming the bottom chamber B, which may be termed the "gas expansion and condensing chamber." The gas-generating chamber F is placed at one side adjacent to the water-tank and provided at the top with a trap-screw H, which closes the charging-opening. A perforated basket or holder G is provided for holding carbid of calcium or other chemical substance and is attached by the hook $g'$ to the trap-screw H, so that it will be suspended in the generating-chamber F. A trap-screw I is secured in the wall at the lower end of chamber F to provide for cleaning out the spent lime after the charge of carbid has been exhausted. A water-pipe $b^2$, having a valve $b'$, is connected by a union-coupler $c$ with the lower end of generator F and with the bottom of the water-tank A for permitting the to-and-fro flow of water between the generator and tank, according to the pressure of gas. This water-pipe connection is shown in both Figs. 1 and 2, and in both cases the flow of water is controlled by the hand-valve $b'$. An outlet gas-pipe $h'$ connects with top of the generator F and is provided with a valve $b$ for controlling the flow of gas by hand. This pipe $h'$ is connected by the union-coupler $c'$ to the pipe $h^2$, which passes through the wall of water-tank A, thence down through the tank and its partition-plate $b^6$, and opens into the expansion and condensing chamber B. A similar pipe $b^3$ leads from chamber B partly up through tank A and out through the wall thereof, where it is connected by the union-coupler $b^4$ to the short pipe $b^5$, which opens into the gas expansion and condensing chamber L. This chamber L may form the base of the regulator J and be separated therefrom by the horizontal partition-plate $j$.

Within the water-chamber of the regulator J is placed the rising-and-falling float or gasometer K, the top of which is connected to the downwardly-projecting rod 9, which passes through the guideway 10, secured to the wall of the regulator J. The lower end of rod 9 is loosely engaged with the outer end of the needle-valve lever $6^b$. This lever $6^b$ is pivotally connected at $6^a$ to the top of the standard 5, which is secured at its lower end to a projection of the injector or gas and air mixer O. The gas and air mixer or injector O is constructed with the needle-valve case 1, the injector-nozzle 2 having a jet-orifice, an air-port 3, and an extension-tube 4, having a funnel-shaped mouth and a contracted portion extending down into the pipe 12. The air-port 3 is placed just at the top of the funnel-shaped mouth of the extension-tube 4 and just below the jet-opening of the injector-nozzle tube. The upper end of the needle-valve 6 is provided with an eye, which is engaged by the short end of the pivoted lever $6^b$ and is secured in place by a set-screw or pivotal pin. A gas-pipe 15 connects with the gas-chamber L and also with the inlet of the injector. The gas-pipe 12 connects the injector with the house service-pipe N and with the return gas-pipe 16, which passes into the gas-chamber L, where it connects with the pipe M, leading up into the floating holder K of the regulator. The lower end of pipe 12 is provided with a drip-cock 14. A trap-plug E is fitted in the wall of chamber B to provide for cleaning out the same. By means of the contracted extension-tubes 4 gas is delivered to the house service-pipe under light pressure, so that gas will not pass back and escape through the air-port 3.

In large machines where it is desirable to store a volume of gas I preferably place a gasometer $a$ in the water-tank A and have the gas-pipes $b^3$ and $h^2$ open above the water-line in said gasometer. The gas-pipe $h'$, leading from the generator, connects with the chamber B, and the pipe $h^2$ extends up through water-tank A and opens above the water-line into the gasometer. In order to control the flow of gas from the generator through pipe $h'$, I arrange the yoked stem $x\ x$ of the valve $b$ to be engaged by the tappets $x\ x'$ on rod $9^a$, which is attached to the top of the gasometer. When the gasometer $a$ rises and becomes filled with gas, the lower tappet $x'$ by contact with the stem will close the valve $b$, thus shutting off the flow of gas. The gas now accumulating under pressure in the generator will force the water back through pipe $b^2$ into the water-tank A, the same as will be the case in the apparatus shown in Fig. 1. When the gasometer falls, the upper tappet $x$ by engaging the stem opens the valve $b$, thus permitting gas to flow out of the generator through pipe $h'$ and water to again flow from tank A through pipe $b^2$ into the generator. A similar operation is effected through the rise and fall of the gasometer K in the regulator J. The gasometer K, being raised and full of gas, will close the needle-valve 6, thereby shutting off the flow of gas, so that gas will accumulate under pressure in the generator and force the water out through pipe $b^2$ into the water-tank A. When the gasometer K falls, it again opens the needle-valve, permitting gas to flow from the generator, thereby relieving the pressure in the latter and permitting water to flow thereto from tank A through pipe $b^2$ for again generating gas. During the generation of gas the water in the generating-chamber becomes heated, causing much vapor and steam to be passed off with the gas. This watery vapor and steam must be condensed, so as to make the gas dry as possible. For this purpose I provide the expansion and condensing chambers B and L, in which the gas is expanded and cooled, causing the water-vapor to be precipitated. These expansion-chambers are therefore important features in my apparatus. My apparatus operates automatically through the medium of the rising and falling gasometer K of the regulator, which opens and closes the needle-valve or which will open and close another form of valve in a gas-outlet pipe which connects with the generator. When the carbid of calcium is exhausted and the apparatus ceases to make gas, the water-supply is turned off by closing valve $b'$, the gas-valve $b$ is closed, the trap-screw I is opened, trap H is opened, and the basket G is lifted out and cleansed. The generating-chamber F is also cleaned and the water drawn off through the opening for trap I. The basket G being recharged with calcium carbid and placed in the generator, the traps are screwed up in place, the gas-valve $b$ and the water-valve $b'$ are opened. The gasometer K of the regulator rises and falls according to the number of burners in use, and thus automatically regulates the generation of gas. Gas passes through pipe 15 to the needle-valve case 1 and escapes through the jet-opening, thereby drawing in the proper proportion of air to make an illuminating-gas that can be used in any ordinary kind of burner.

Having described my invention, what I claim as new, and desire to secure by Letters Patent, is—

1. In an acetylene-gas-generating apparatus, the combination with a water-tank A, having a gas expansion and condensation chamber B at the bottom, of a generating-chamber having a carbid-holder, a water-pipe, having a valve, connecting the base of the generator with the base of the water-tank, a gas-pipe connecting with the top of the generator and passing down through the water-tank to chamber B, a gas-outlet pipe leading from said chamber through the water-tank and connecting with a pipe having a controlling-valve, a regulator having a rising and falling gasometer, devices connecting said controlling-valve with the regulator and a gas-inlet pipe to the regulator, substantially as and for the purpose described.

2. In an acetylene-gas-generating apparatus, the combination with the water-supply tank, of a generating-chamber having a carbid-holder, a valved water-pipe connecting said tank with the base of the generator, a gas-outlet pipe leading from the top of the generator, a gas and air mixer O having a controlling-valve, an expansion and condensation chamber between the generator and said gas and air mixer, a gas-supply pipe connecting said chamber with the mixer, a gas-regulator, a pipe leading from the mixer to said regulator and devices connecting the regulator with said controlling-valve, substantially as and for the purpose set forth.

3. In an acetylene-gas-generating apparatus, the water-supply tank and the gas-generator having a carbid-holder, and a valved water-pipe connecting said tank and the generator at the base, in combination with chamber B, an expansion and condensation chamber L, a gas-pipe connecting the generator with said chamber L, a gas and air mixer O having a controlling needle-valve 6, a pipe 15 connecting chamber L with said mixer, a regulator having a rising and falling gasometer above said chamber L, operating devices connecting the gasometer with said needle-valve, discharge-pipe 12 from the mixer, the house service-pipe N and the return gas-pipe 16 connecting with pipe 12, said pipe 16 passing up into the gasometer of the regulator whereby steam or water vapor will be condensed before the gas enters the mixer and gas from the house service-pipes will quickly act on the regulator to control the flow of gas, substantially as and for the purpose set forth.

In testimony whereof I affix my signature in presence of two witnesses.

JOSEPH S. WOOD, Sr.

Witnesses:
JOHN J. CARBERRY,
ALEX. W. SELFRIDGE.